United States Patent [19]

Kline

[11] Patent Number: 4,535,040
[45] Date of Patent: Aug. 13, 1985

[54] BATTERY GRID

[75] Inventor: Richard H. Kline, Anderson, Ind.

[73] Assignee: General Motors Corporation, Detroit, Mich.

[21] Appl. No.: 565,394

[22] Filed: Dec. 27, 1983

Related U.S. Application Data

[63] Continuation of Ser. No. 344,130, Jan. 29, 1982, abandoned, which is a continuation of Ser. No. 179,806, Aug. 20, 1980, abandoned.

[51] Int. Cl.³ .............................................. H01M 4/74
[52] U.S. Cl. .................................... 429/234; 429/241; 429/242
[58] Field of Search ................ 429/234, 241, 242, 233

[56] References Cited

U.S. PATENT DOCUMENTS

| | | | |
|---|---|---|---|
| 1,088,210 | 2/1914 | Davis | 429/234 |
| 1,982,485 | 11/1934 | Salmon et al. | 429/242 X |
| 2,256,105 | 9/1941 | Shank | 429/234 X |
| 4,190,702 | 2/1980 | Pun et al. | 429/4 |

Primary Examiner—Anthony Skapars
Attorney, Agent, or Firm—Lawrence B. Plant

[57] ABSTRACT

An expanded metal battery grid and process for making same which grid has a supporting border comprising a thermoplastic ribbon folded lengthwise around the grid's edge and ultrasonically bonded to itself through interstices in the grid.

2 Claims, 6 Drawing Figures

U.S. Patent  Aug. 13, 1985  4,535,040
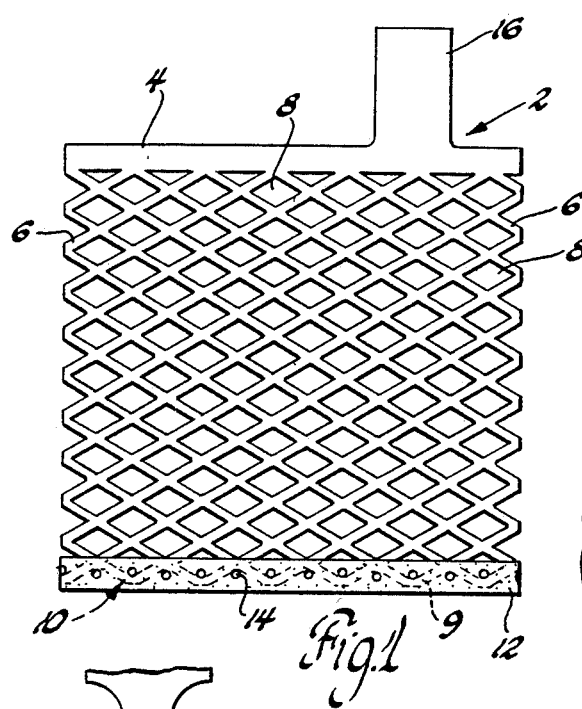
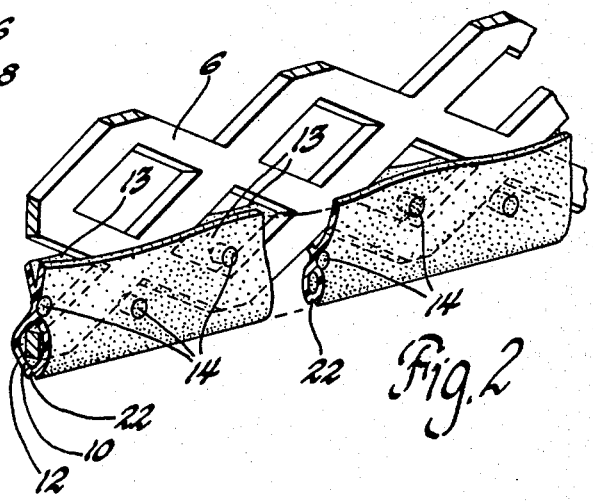
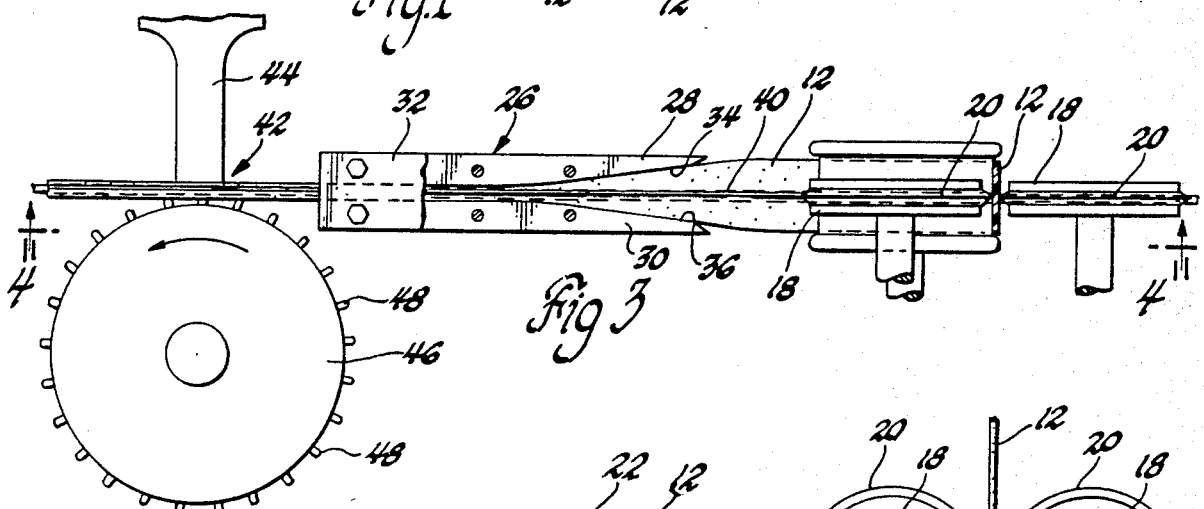
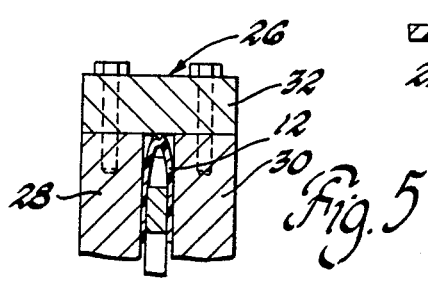
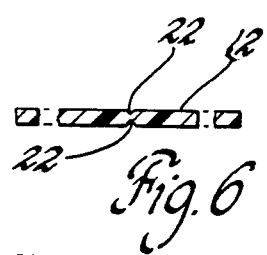
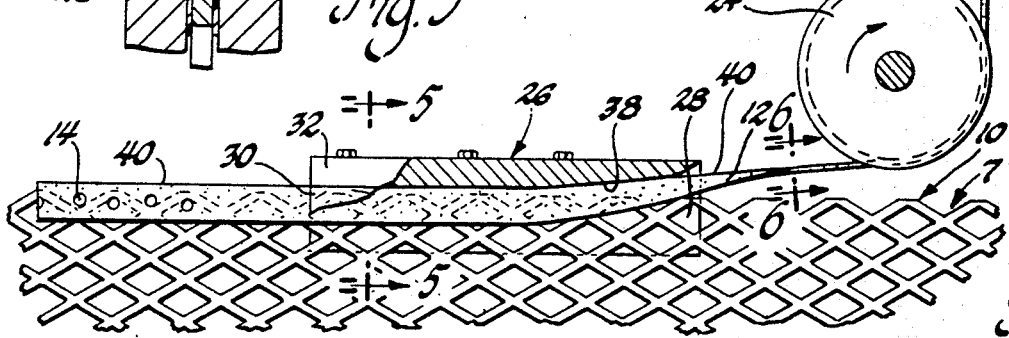

BATTERY GRID

This is a continuation of application Ser. No. 344,130 filed on Jan. 29, 1982, now abandoned, which itself is a continuation of application Ser. No. 179,806 filed Aug. 20, 1980, now abandoned.

FIELD OF THE INVENTION

This invention relates to grids for supporting the active materials of electric storage batteries and more particularly to grids made from bilaterally expanded grid-making stock.

U.S. patent Daniels et al U.S. Pat. No. 3,853,626 discloses a continuous in-line process for making bilateral lengths of lead-acid storage battery grid-making stock having an unexpanded strip at the longitudinal center of the stock, two reticulated grid wire networks expanded laterally from the unexpanded center strip and unexpanded metal strips at the distal edges of the grid wire networks remote from the center strip. The grid's current collecting header is formed from the center strip and is typically the grid's top border. The unexpanded distal edge strips ultimately form the supporting border of the grid and is typically the grid's bottom border. More specifically, the Daniels et al process advances a narrow lead strip (i.e., about 1 mm thick) longitudinally between two rows of dies and reciprocating cutters which converge in incremental steps toward the longitudinal center of the strip. The cutters shear wire-like segments from the longitudinal edges of the strip to expand the strip laterally into two networks of interconnected segments extending outwardly in opposite directions from the center strip. The wire-like segments define a plurality of diamond-shaped interstices for retaining the battery's pasty active material. The thusly expanded strip is thereafter flattened to yield a grid of the type described in Wheadon et al U.S. Pat. No. 3,881,952. The grid wire networks are subsequently filled with battery reactant (e.g. as by belt pasting) and finally cut into individual battery plates.

The integral metal bottom border of grids so formed serves: to evenly distribute the weight of the plate over the entire bottom edge of the grid; to support the finished plate atop the mud ribs of a battery container, when such ribs are provided; to retain the active material in the bottom interstices of the grid adjacent the border; and to prevent the grid wires from puncturing battery's microporous separators, at the bottom folds thereof, in the case of separator-enveloped plates. Unfortunately, such metal borders add significantly to both the weight and cost of the grid.

It is an object of this invention to provide a relatively light-weight, low cost expanded metal battery grid for supporting the active material of a storage battery by substituting a folded, spot-welded thermoplastic border for the metal border typically used heretofore.

It is a further object of this invention to provide a process for making such a grid from continuous lengths of bilaterally expanded grid-making stock by enfolding the lateral edges thereof in a thermoplastic ribbon and subsequently spot welded the ribbon to itself through openings in the stocks.

These and other objects and advantages of the present invention will become more readily apparent from the detailed description thereof which follows:

BRIEF DESCRIPTION OF THE INVENTION

The present invention comprehends an expanded metal grid for supporting the active material of an electric storage battery wherein the grid includes: a metal current collecting header along one edge (e.g. the top edge) thereof; a network of conductive grid wires extending from the header throughout the major extent of the grid and such as to define a plurality of diamond shaped interstices therebetween for receiving the battery's active material; a succession of grid wire loops defining a second, scallopped edge of said network remote from the header edge; and a border comprising thermoplastic ribbon folded lengthwise about the scallopped edge such that the wings of the fold sandwich the edge loops therebetween. Preferably, the expanded grid-wire network is formed by the bilateral expansion process of Daniels et al and the border-forming plastic ribbons (i.e. one for each lateral network) are each folded about, and secured to, the scallopped edges of the grid-making stock in a continuous operation. In this regard, the plastic ribbon is folded lengthwise and the edge of the grid-wire network inserted into the thusly formed crease such that the wings of the folded ribbon straddle the scalloped edge. The wings are thereafter ultrasonically spot-welded together through the diamond-shaped interstices along the edge of the grid.

The folded border of the present invention provides all of the benefits of the integral metal border and more. Vibration tests indicate the plates made from grids having plastic borders tend to retain their active materials longer than grids made with metal bottom borders. Apparently the plastic border cushions the plates base and thereby prolongs the retention of the active material. Moreover the plastic ribbon at the edge of the grid reduces the possibility of internal shorting due to treeing around the edge of the battery separator or through any cracks therein at the bottom folds of typical separator-enveloped plates. The plastic border of the present invention provides the above-mentioned advantages and all with significant weight and cost reductions.

Process-wise a substantially flat plastic ribbon is fed toward a continuous length of expanded grid-making stock, and caused to continuously enfold the lateral edges of the stock. In this regard, a three-sided plow including a funnel-like entrance of converging angling surfaces receives both the plastic ribbon and the edge of the expanded stock such as to progressively gently fold the ribbon lengthwise about the edges of the stock. Following the plow, the two wing-like portions of the ribbon straddling the edge are ultrasonically welded to each other at a plurality of sites between the interstices of the grid-wire network to secure the ribbon to the edge of the grid.

DETAILED DESCRIPTION OF THE DRAWINGS

FIG. 1 is a front view of an expanded metal storage battery grid in accordance with the present invention;

FIG. 2 is an enlarged, perspective, partially broken away view of the folded plastic ribbon border of FIG. 1;

FIG. 3 depicts a partially sectioned front elevational view of apparatus for folding the plastic ribbon in accordance with the process of the present invention;

FIG. 4 is a partially sectioned partial bottom view of the apparatus of FIG. 3 taken in the direction 4—4 thereof;

FIG. 5 is an enlarged sectioned side elevational view taken in the direction 5—5 of FIG. 4; and, FIG. 6 is an enlarged sectioned side view of the plastic ribbon taken in the direction 6—6 of FIG. 4.

FIGS. 1 and 2 illustrate a preferred embodiment and show an expanded-metal-type lead acid storage battery grid 2 having a current collecting header 4, and a plurality of grid wires 6 integral therewith. The grid wires 6 form the paste-retaining network of the grid and define a plurality of diamond-shaped interstices 8. A succession of grid wire loops 9 define a scallopped edge 10 at the bottom of the grid. A thermoplastic ribbon 12 is folded lengthwise about the scallopped edge 10 so as to provide two wings 13, one on each side of the grid wire network at the edge 10. The wings 13 are fused together at a plurality of welds 14 spaced apart along the ribbon 12 and between the several interstices 8 at the edge 10. The header 4 includes a lug 16 for electrically joining the grid 2 to similar grids in a battery cell.

FIGS. 3 and 4 depict the preferred process for enfolding edge 10 of grid 2 in a thermoplastic ribbon 12. A flat thermoplastic ribbon 12 is fed from a reel (not shown) toward the advancing strip of expanded metal grid-making stock 7. The ribbon 12 first passes into the nip of a pair of coacting rollers 18 having blades 20 on the peripheries thereof. The blades 20 score center line of the ribbon 12 as best shown at 22 in FIG. 6. Scoring the ribbon 12 facilitates folding of the ribbon 12 at the longitudinal center thereof. In the alternative, of course, prescored ribbons could be used hence obviating the need for rollers 18 adjacent the production line. As illustrated the scored ribbon 12 next passes over idler roller 24 to bring the ribbon 12 into substantial alignment with the edge 10 of the grid stock 7 entering the folding station. In many installations the idler roller 24 could be eliminated and the ribbon 12 fed directly to the folding station from the reel.

The distal edge 10 of the grid stock 7 and the ribbon 12 converge at a plow 26. The plow 26 includes a top guide plate 28, a bottom guide plate 30 and a fold guide plate 32 bolted together, as illustrated. The top and bottom guide plates 28 and 30 have angled surfaces 34 and 36 respectively to gently cam the otherwise flat ribbon 12 entering the plow 26 into a U-fold about the distal edge 10 of the grid-making stock 7 entering the plow 26. Similarly the fold guide plate 32 has an angling surface 38 which urges the fold 40 of the ribbon 12 toward the edge 10 of the grid-making stock near the exit of the plow 26 (see FIG. 5).

Immediately following the folding station (i.e. plow 26) the ribbon straddled edge 10 enters a welding station 42 where the wings 13 of the ribbon 12 are fused together at a plurality of spaced apart weld sites 14. The welding station 42 includes a continuously vibrating ultrasonic horn 44 and a rotating wheel 46 carrying a plurality of welding tips 48 on the periphery thereof. The wheel 46 rotates at a rate commensurate with the lineal speed of the grid-making stock 7. The welding tips 48 are spaced about the periphery of wheel 46 so as to coincide with the interstices 8 along the edge 10 of the grid-making stock 7 and serve to press the wings 13 together against the underside of the horn 44 to fuse the wings 13 together through the interstices 8.

Virtually any ultrasonically weldable thermoplastic material can be used for the border. Polypropylene homo- and co-polymers (e.g. with polyethylene) are preferred for their strength, cost and ready workability.

In one specific example the plastic border 12 comprises a polypropylene ribbon about 13 mm wide by about 0.25 mm thick. The ribbon straddles the grid wire network such that the wings thereof extend up the sides of the network from the bottom edge about 6 mm and are fused together at intervals through the interstices by welds which are approximately 1.7 mm in diameter. The weld-making ultrasonic horn vibrates at a frequency of about 20,000 cycles per second.

While this invention has been disclosed primarily in terms of forming a bottom plastic border it is to be appreciated that the border may be located on any of the grid's edges. Further though the invention has been illustrated in terms of specific embodiments thereof it is not intended to be limited thereto but rather only to the extent set forth in the claims which follow.

The embodiments of the invention in which an exclusive property or privilege is claimed is defined as follows:

1. A substantially planar grid for supporting the active material of an electric storage battery comprising: a conductive current collecting header along a first edge of said grid; a network of conductive wires extending from said header throughout the major extent of said grid, said wires defining a plurality of interstices for receiving said active material and forming a scalloped second edge opposite said first edge; a thin, flexible, thermoplastic ribbon enclosing said scalloped edge, said ribbon being folded lengthwise about said scalloped edge so as to provide a longitudinal crease in said ribbon extending along the periphery of the grid opposite said header and two wing-like ribbon portions diverging from said crease on opposite sides of said network and sandwiching said scalloped edge therebetween; and a plurality of spot welds in said ribbon portions and extending through said interstices along said second edge for joining said portions one to the other therethrough and thereby securing said folded ribbon to said scalloped edge.

2. A grid for supporting the active material of an electric storage battery comprising a conductive current collecting header along a first edge of said grid, a network of conductive wires extending from said header throughout the major extent of said grid and defined in part by a scalloped second edge opposite said first edge, said wires defining a plurality of interstices for receiving said active material, and a thermoplastic border enfolding said scalloped edge, said border comprising a plastic ribbon folded along its longitudinal axis and having two wings disposed on opposite sides of said network, said wings being spot-welded one to the other at a plurality of sites through said interstices along said scalloped edge.

* * * * *